US011328228B2

(12) United States Patent
Yu et al.

(10) Patent No.: US 11,328,228 B2
(45) Date of Patent: May 10, 2022

(54) LOCATION ALLOCATION PLANNING

(71) Applicant: International Business Machines Corporation, Armonk, NY (US)

(72) Inventors: Ying-Chen Yu, Taipei (TW); June-Ray Lin, Taipei (TW); Yi-Chun Tsai, Taipei (TW); Tzu-Ching Kuo, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 163 days.

(21) Appl. No.: 16/390,155

(22) Filed: Apr. 22, 2019

(65) Prior Publication Data

US 2020/0334582 A1      Oct. 22, 2020

(51) Int. Cl.
*G06Q 10/02* (2012.01)
*G06Q 10/04* (2012.01)

(52) U.S. Cl.
CPC ........... *G06Q 10/02* (2013.01); *G06Q 10/043* (2013.01)

(58) Field of Classification Search
CPC ........ G07C 2011/02; G07C 9/28; G07C 9/27; G07C 11/00; G07C 2011/04; G07C 9/22;
(Continued)

(56) References Cited

U.S. PATENT DOCUMENTS

2002/0046157 A1   4/2002  Solomon
2002/0069134 A1   6/2002  Solomon
(Continued)

FOREIGN PATENT DOCUMENTS

CA    2787865 A1   2/2014
EP    2916267 A1   9/2015
(Continued)

OTHER PUBLICATIONS

Anastasios Noulas, Salvatore Scellato, Neal Lathia, Cecilia Mascolo, A Random Walk Around the City: New Venue Recommendation in Location-Based Social Networks, Sep. 1, 2012, 2012 Conference on Privacy, Security, Risk and Trust and 2012 International Conference on Social Computing (pp. 144-153) (Year: 2012).*
(Continued)

*Primary Examiner* — Emmett K. Walsh
*Assistant Examiner* — Larita L. Yusuf
(74) *Attorney, Agent, or Firm* — Stephanie L. Carusillo

(57) ABSTRACT

In an approach location allocation planning, one or more computing units determine at least one location matching model for a first current participating entity of a plurality of current participating entities of a current event, wherein an output of the location matching model indicates a matching degree between the first current participating entity and a current event location. The one or more computing units create at least one initial location allocation plan for the plurality of current participating entities of the event based, at least in part, on the at least one location matching model. The one or more computing units receive feedback from at least one of the plurality of current participating entities. Responsive to the feedback indicating acceptance of the initial location allocation plan, the one or more computing units determine a final location allocation plan based on the initial location allocation plan.

15 Claims, 9 Drawing Sheets

(58) Field of Classification Search
CPC .. G07C 9/00571; G07C 9/00904; G07C 9/37; G06Q 10/00; G06Q 90/00; G06Q 50/00; G06N 20/00
USPC .......................................................... 705/5
See application file for complete search history.

(56) References Cited

U.S. PATENT DOCUMENTS

| | | | | |
|---|---|---|---|---|
| 2002/0194018 | A1* | 12/2002 | Scott | G06Q 40/04 705/1.1 |
| 2005/0120052 | A1* | 6/2005 | Miller | G06Q 10/109 |
| 2008/0052217 | A1* | 2/2008 | Etkin | G06Q 40/04 705/37 |
| 2009/0249350 | A1* | 10/2009 | Senders | G06Q 10/10 718/104 |
| 2010/0017315 | A1* | 1/2010 | Hahn-Carlson | G06Q 40/12 705/30 |
| 2012/0259842 | A1* | 10/2012 | Oman | G06Q 10/1093 707/722 |
| 2012/0317203 | A1* | 12/2012 | Hostetler | G06Q 50/01 709/204 |
| 2013/0006693 | A1* | 1/2013 | Haynes, III | G06Q 10/1095 705/7.23 |
| 2014/0229560 | A1* | 8/2014 | Gray | H04L 12/1818 709/206 |
| 2014/0316836 | A1* | 10/2014 | Lipscher | G06Q 10/1093 705/7.19 |
| 2015/0019273 | A1* | 1/2015 | Grosz | G06Q 50/01 705/5 |
| 2016/0189061 | A1* | 6/2016 | Jain | G06Q 10/02 705/5 |
| 2016/0247100 | A1* | 8/2016 | Balestrieri | G06Q 10/0631 |
| 2016/0275458 | A1* | 9/2016 | Meushar | G06Q 10/1095 |
| 2017/0091713 | A1* | 3/2017 | Paris | G06Q 10/1093 |
| 2017/0212898 | A1* | 7/2017 | Desmond | G06Q 10/06 |
| 2017/0236097 | A1* | 8/2017 | Smith | G06Q 10/1095 705/7.19 |
| 2019/0272509 | A1* | 9/2019 | Livnat | H04W 4/33 |

FOREIGN PATENT DOCUMENTS

| | | | | |
|---|---|---|---|---|
| WO | WO-0043927 | A2 * | 7/2000 | G06Q 10/02 |
| WO | 2003067494 | A1 | 8/2003 | |
| WO | 2015168704 | A9 | 5/2015 | |

OTHER PUBLICATIONS

Julia Kiseleva et al., Beyond Movie Recommendations: Solving the Continuous Cold Start Problem in E-commerce Recommendations, Jul. 26, 2016, https://arxiv.org/abs/1607.07904 (Year: 2016).*

Yang et al., "Personalization in dynamic assortment planning: An analysis based on multi-agent simulation method", 2017 5th International Conference on Enterprise Systems, © 2017 IEEE, DOI 10.1109/ES.2017.32, 6 pages.

Mell et al., "The NIST Definition of Cloud Computing", Recommendations of the National Institute of Standards and Technology, Special Publication 800-145, Sep. 2011, 7 pages.

* cited by examiner

LOCATION ALLOCATION PLANNING

BACKGROUND OF THE INVENTION

The present invention relates generally to the field of analytics technology, and more particularly to location allocation planning.

Location allocation is conventionally performed manually to determine optimal locations for multiple entities/facilities/parties that all need to be located in an event. For example, exhibitions, trade shows, and trade fairs can be rewarding experiences for business owners to promote their business or market their products or services. However, without careful planning and research, such an event can play a counterproductive effect to a participating entity. There are several factors that need to be considered for an event participant: budget, booth location, booth size, surrounding vendors, potential audience, and so on. Also, there are several factors that need to be considered for an event planner: needs of each participant, how to attract more vendors to an event, how to efficiently make a location allocation plan that can be accepted by all interested vendors, and so on. However, in reality, event participants may not be satisfied with the booth allocation plan, and the event planner may need to negotiate with each event participant for multiple rounds, which can be time consuming and inefficient, especially when there is a large number of participants with whom negotiations are needed.

SUMMARY

Embodiments of the present invention disclose a method, a computer program product, and a system for location allocation planning. The method may include one or more computing units determining at least one location matching model for a first current participating entity of a plurality of current participating entities of a current event, wherein an output of the location matching model indicates a matching degree between the first current participating entity and a current event location. The one or more computing units create at least one initial location allocation plan for the plurality of current participating entities of the event based, at least in part, on the at least one location matching model. The one or more computing units receive feedback from at least one of the plurality of current participating entities. Responsive to the feedback indicating acceptance of the initial location allocation plan, the one or more computing units determine a final location allocation plan based on the initial location allocation plan.

DETAILED DESCRIPTION

Figure 1:
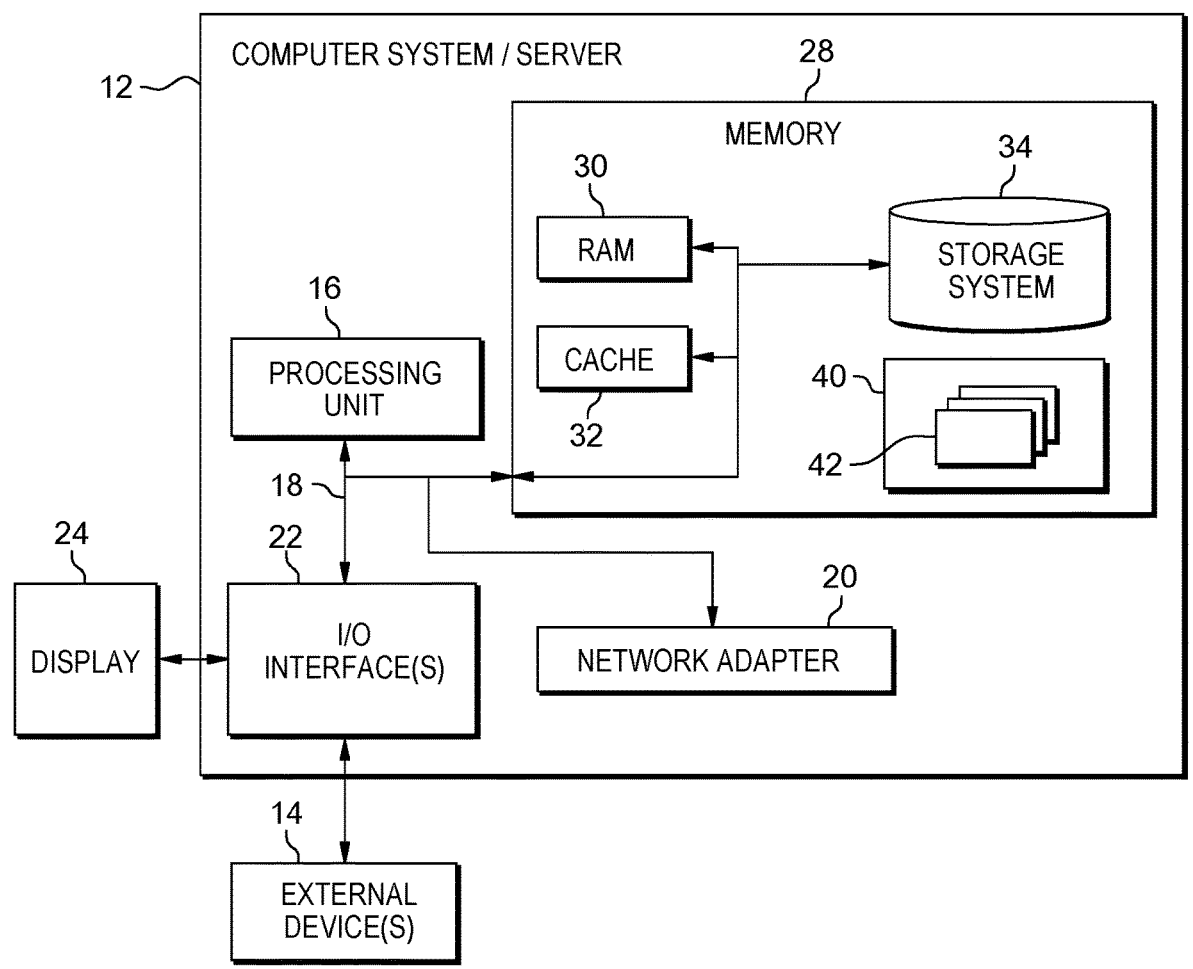
FIG. 1 depicts a cloud computing node according to an embodiment of the present disclosure.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
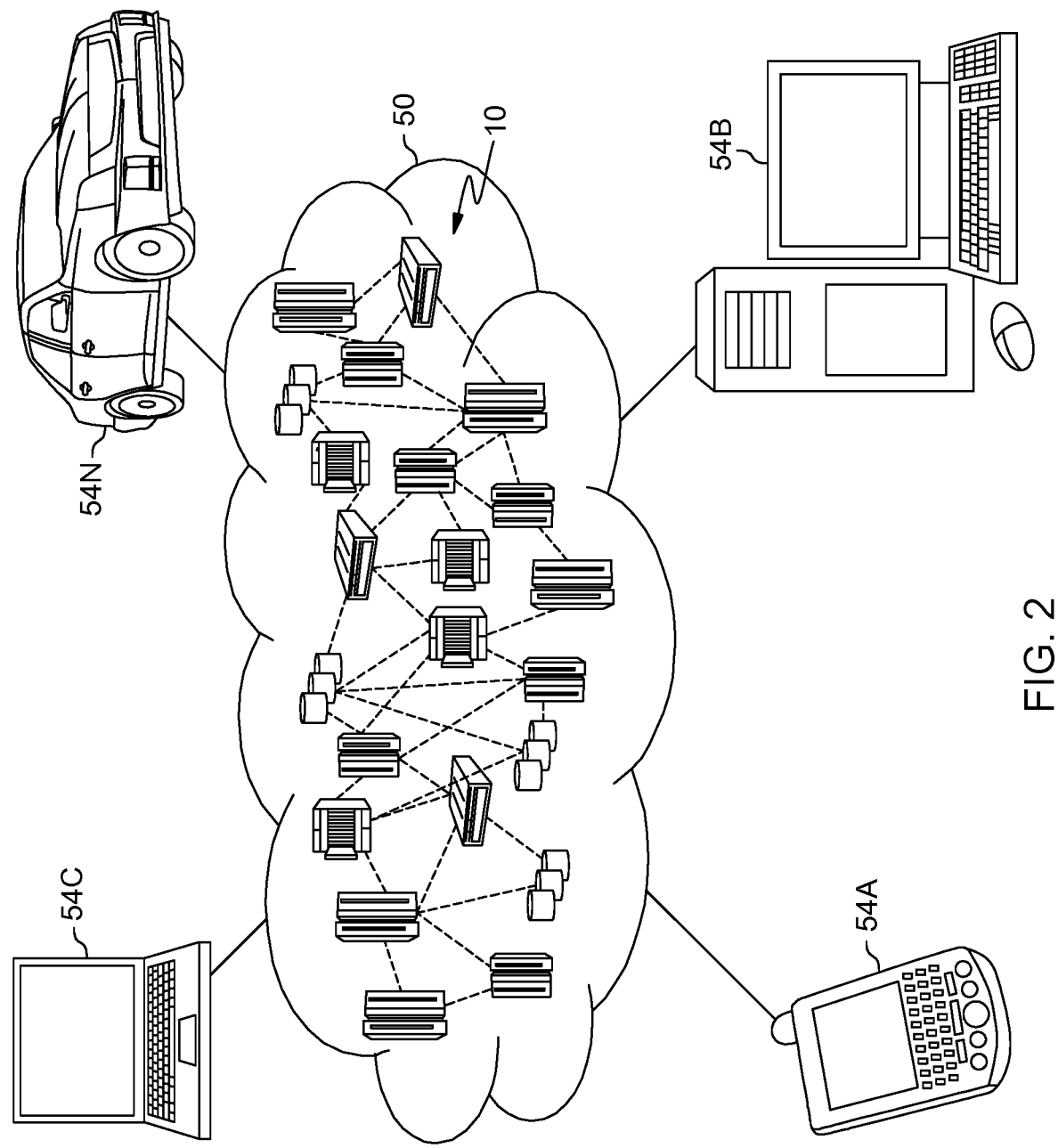
FIG. 2 depicts a cloud computing environment according to an embodiment of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
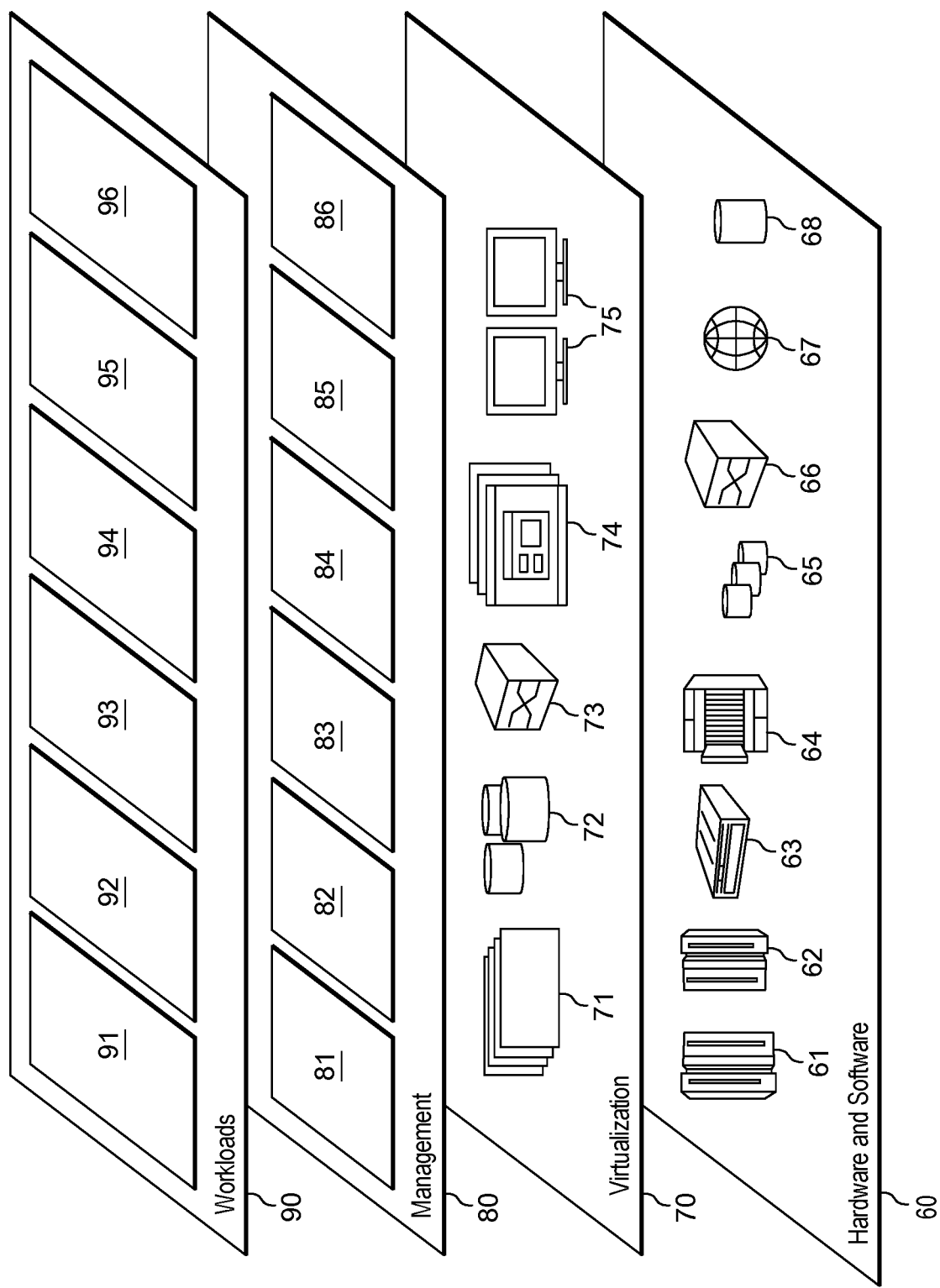
FIG. 3 depicts abstraction model layers according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and location allocation planner 96.

The following description describes location allocation planning for an exhibition as an example to describe embodiments of location allocation planning. But it is known to a person skilled in the art that the embodiments of location allocation planning can be used for any location allocation for any other event, including but not limited to trade shows, fairs, shopping malls, parking lots, etc.

Rule-based algorithms can be used to generate location allocation plans, such as allocating a bigger booth to a vendor who intends to pay more, but there are a number of unwritten rules which are either too hard to describe or which the vendors are unwilling to disclose, to enable a rule-based location allocation. For example, a vendor may have a preference that could hurt the feelings of another vendor if the other vendor was aware. In another example, a vendor may feel that revealing the vendor does not want to be located near a competitor will imply a weakness on the part of the vendor. Thus, rules may be too complex, dynamic, or diversified to be written down. Sometimes, the complexity is a result of different vendors having different rules to be applied. For example, vendor A, who is selling pens, does not want to be placed adjacent to vendor B, who is selling pencils, to avoid customers being distracted by vendor B, while vendor C, who is also selling pens, does want to be placed adjacent to vendor B because vendor C thinks being adjacent to vendor B can bring more customers. In another example, vendor D does not want to be placed adjacent to vendor E just because vendor D does not like vendor E, but there is no general rule can be used to describe this specific preference. In another example, vendor F wants to be set adjacent to an exit of the exhibition hall, making it easier for vendor F to unload goods, but there is no such rule set in advance in any rule-based algorithm. In yet another example, this is the first time vendor G is attending an exhibition, so vendor G wants to be placed in a spot which will attract attention from customers, while other vendors, with a similar size or type of business as vendor G, may be inclined to be placed in a cost effective spot, however such a rule is not descried in any previous rule based algorithm.

Embodiments of the present invention recognize that a machine learning model can develop accurate input for location allocation planning even when the input is not directly received. Embodiments of the present invention recognize that efficiency may be gained by basing an initial location allocation plan on data from one or more past location allocation plans. According to various embodiments, an AI location allocation planner can learn from the past allocation plans without asking the vendors to reveal their underlying rules and hidden preferences to create an optimal location allocation plan, and based on feedback from all vendors, a final location allocation plan can be created.

Figure 10:
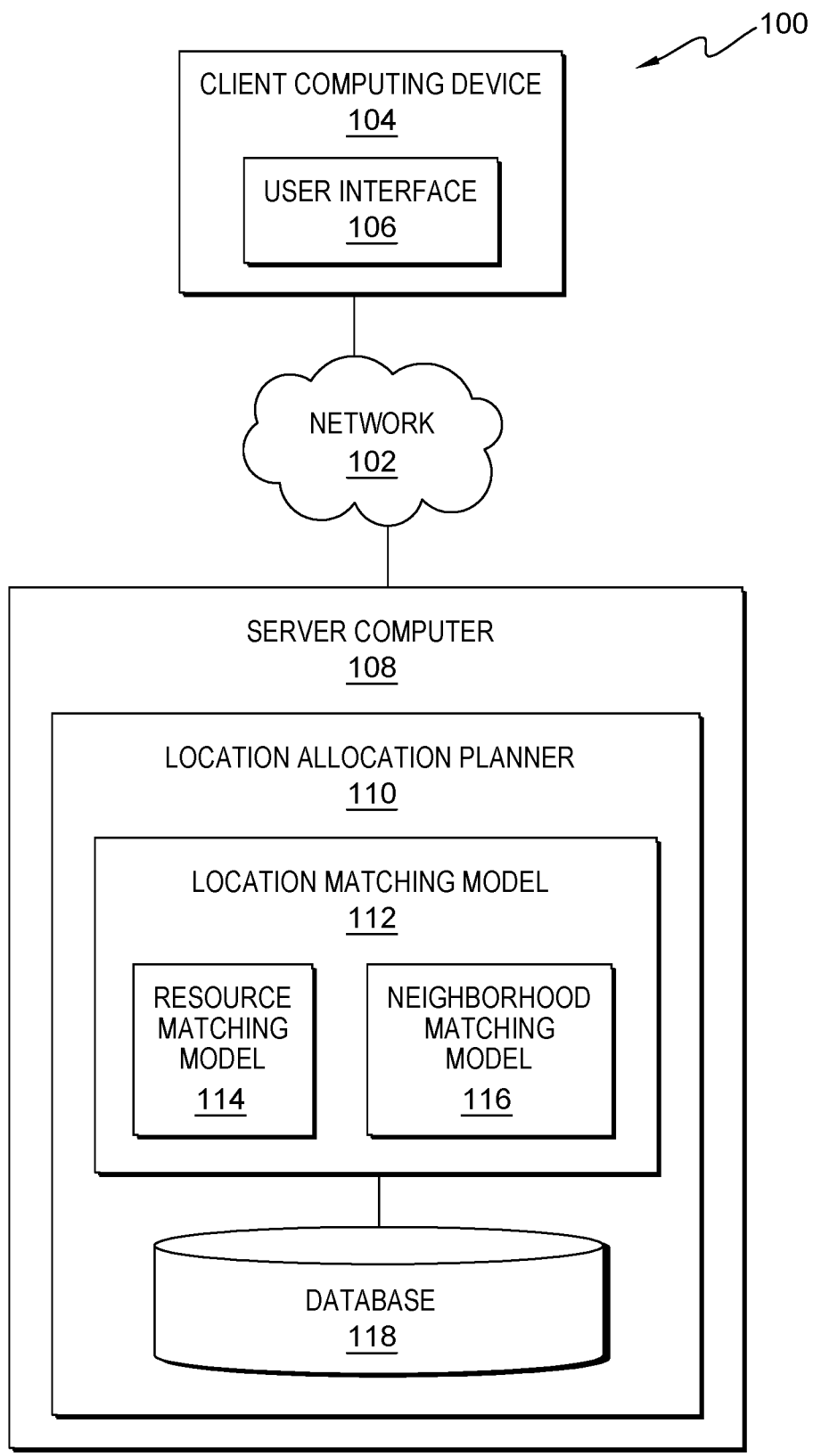
FIG. 10 is a functional block diagram illustrating a distributed data processing environment, in accordance with an embodiment of the present disclosure.

FIG. 10 is a functional block diagram illustrating a distributed data processing environment, generally designated 100, in accordance with one embodiment of the present disclosure. The term "distributed" as used herein describes a computer system that includes multiple, physically distinct devices that operate together as a single computer system. FIG. 10 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes client computing device 104 and server computer 108, interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between client computing device 104 and server computer 108, and other computing devices (not shown) within distributed data processing environment 100.

Client computing device 104 can be a laptop computer, a tablet computer, a smart phone, or any programmable electronic device capable of communicating with various components and devices within distributed data processing environment 100, via network 102. Client computing device 104 may be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In general, client computing device 104 represents one or more programmable electronic devices or combination of programmable electronic devices capable of executing machine readable program instructions and communicating with other computing devices (not shown) within distributed data processing environment 100 via a network, such as network 102. Client computing device 104 represents one or more devices associated with one or more users. Client computing device 104 includes an instance of user interface 106.

User interface 106 provides an interface between a user of client computing device 104 and server computer 108. In one embodiment, user interface 106 may be graphical user interfaces (GUI) or web user interfaces (WUI) and can display text, documents, web browser windows, user options, application interfaces, and instructions for operation, and include the information (such as graphic, text, and sound) that a program presents to a user and the control sequences the user employs to control the program. In another embodiment, user interface 106 may also be mobile application software that provides an interface between a user of client computing device 104 and server computer 108. Mobile application software, or an "app," is a computer program designed to run on smart phones, tablet computers and other mobile devices. User interface 106 enables a user of client computing device 104 to access server computer 108 for event location allocation planning. User interface 106 presents the user of client computing device 104 with a proposed location allocation plan and enables the user to accept or reject a proposed location, or counter propose a new location. User interface 106 may also enable a user to request a new location allocation plan.

Server computer 108 can be a standalone computing device, a management server, a web server, a mobile computing device, or any other electronic device or computing system capable of receiving, sending, and processing data. In other embodiments, server computer 108 can represent a server computing system utilizing multiple computers as a server system, such as in a cloud computing environment. In another embodiment, server computer 108 can be a laptop computer, a tablet computer, a netbook computer, a personal computer (PC), a desktop computer, a personal digital assistant (PDA), a smart phone, or any programmable electronic device capable of communicating with client computing device 104 and other computing devices (not shown) within distributed data processing environment 100 via network 102. In another embodiment, server computer 108 represents a computing system utilizing clustered computers and components (e.g., database server computers, application server computers, etc.) that act as a single pool of seamless resources when accessed within distributed data processing environment 100. Server computer 108 includes location allocation planner 110. Server computer 108 may include internal and external hardware components, as depicted and described in further detail with respect to FIG. 1.

Location allocation planner 110 uses techniques of machine learning to learn from past location allocation plans to produce new location allocation plans without asking the participating entities to reveal hidden preferences or unspoken rules. Given a new location planning request, via user interface 106, location allocation planner 110 can generate new location allocation plans by leveraging learned, unspoken rules. Location allocation planner 110 presents the new location allocation plan to the participating entities and accepts counter proposals to mediate negotiations from the parties. Location allocation planner 110 also learns bargaining zones of the participating entities and can leverage the information to optimize future location allocation plans. Location allocation planner 110 is depicted and described in further detail with respect to FIG. 5 and FIG. 7. In the depicted embodiment, location allocation planner 110 includes location matching model 112 and database 118.

Location matching model 112 can be used to predict a matching degree between the current participating entity and a location in an upcoming event. Location matching model 112 can be achieved by AI related techniques including, but not limited to, case-based reasoning, Bayesian networks, neural networks, fuzzy systems, decision trees, etc. The output of location matching model 112 indicates a matching degree between the current participating entity and a current location of an event. The current location may be, for example, a booth in a current exhibition. In accordance with embodiments of this disclosure, location matching model 112 may comprise resource matching model 114, neighborhood matching model 116, or both.

Resource matching model 114 creates a resource matching score indicating a matching degree between the current participating entity and a resource feature of a location. Resource matching model 114 is depicted and described in further detail with respect to FIG. 6A.

Neighborhood matching model 116 creates a neighborhood matching score indicating a matching degree between the current participating entity and a neighbor entity which is to be located adjacently. Neighborhood matching model 116 is depicted and described in further detail with respect to FIG. 6B.

It should be understood by those skilled in the art that neither resource matching model 114 nor neighborhood matching model 116 has to be implemented in a standalone model; multiple matching models can be included in location matching model 112 to serve multiple entities.

Database 118 is a repository for data used by location matching model 112. In the depicted embodiment, database 118 resides on server computer 108. In another embodiment, database 118 may reside on client computing device 104 or elsewhere within distributed data processing environment 100 provided location matching model 112 can access database 118. A database is an organized collection of data. Database 118 can be implemented with any type of storage device capable of storing data and configuration files that can be accessed and utilized by location matching model 112, such as a database server, a hard disk drive, or a flash memory. Database 118 stores historical location allocation plans as a training set for location allocation planner 110. Database 118 may also store learned bargaining zones for participating entities for use with future location allocation planning.

Figure 4:
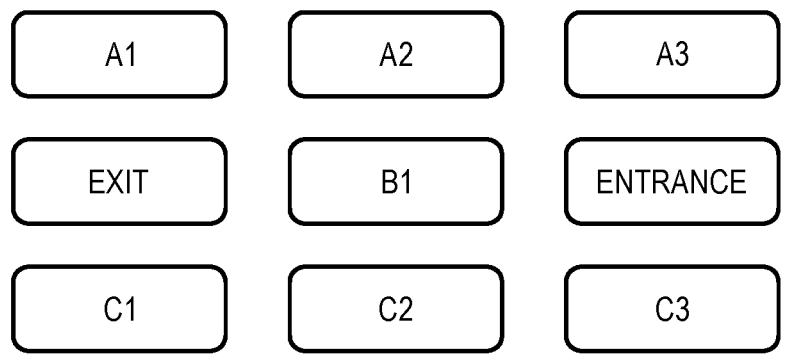
FIG. 4 illustrates an example of booth distribution in an exhibition hall.

FIG. 4 illustrates an example of booth distribution in an exhibition hall. Each of A1-C3 represents a booth to be allocated in an exhibition hall. For simplicity, only seven booths are illustrated with the same size. In reality, booths in an exhibition hall can be much more diversified in nature (e.g., some are big and others are small, some are in an activity area and others are in a display area, some are near a dining area and others are not, etc.), all of which can affect the location allocation. In addition, booths in an exhibition hall can be much greater in number. In the simplified example as illustrated in FIG. 4, only one resource feature is presented, i.e., the place of a location, more specifically, whether the place of a booth is near the entrance or not. As illustrated, booths A3, C3, and B1 are near the entrance. A neighborhood relationship is also illustrated in FIG. 4, e.g., A2 is a neighbor of A1, while B1, A1, and A3 are neighbors of A2, etc.

Figure 5:
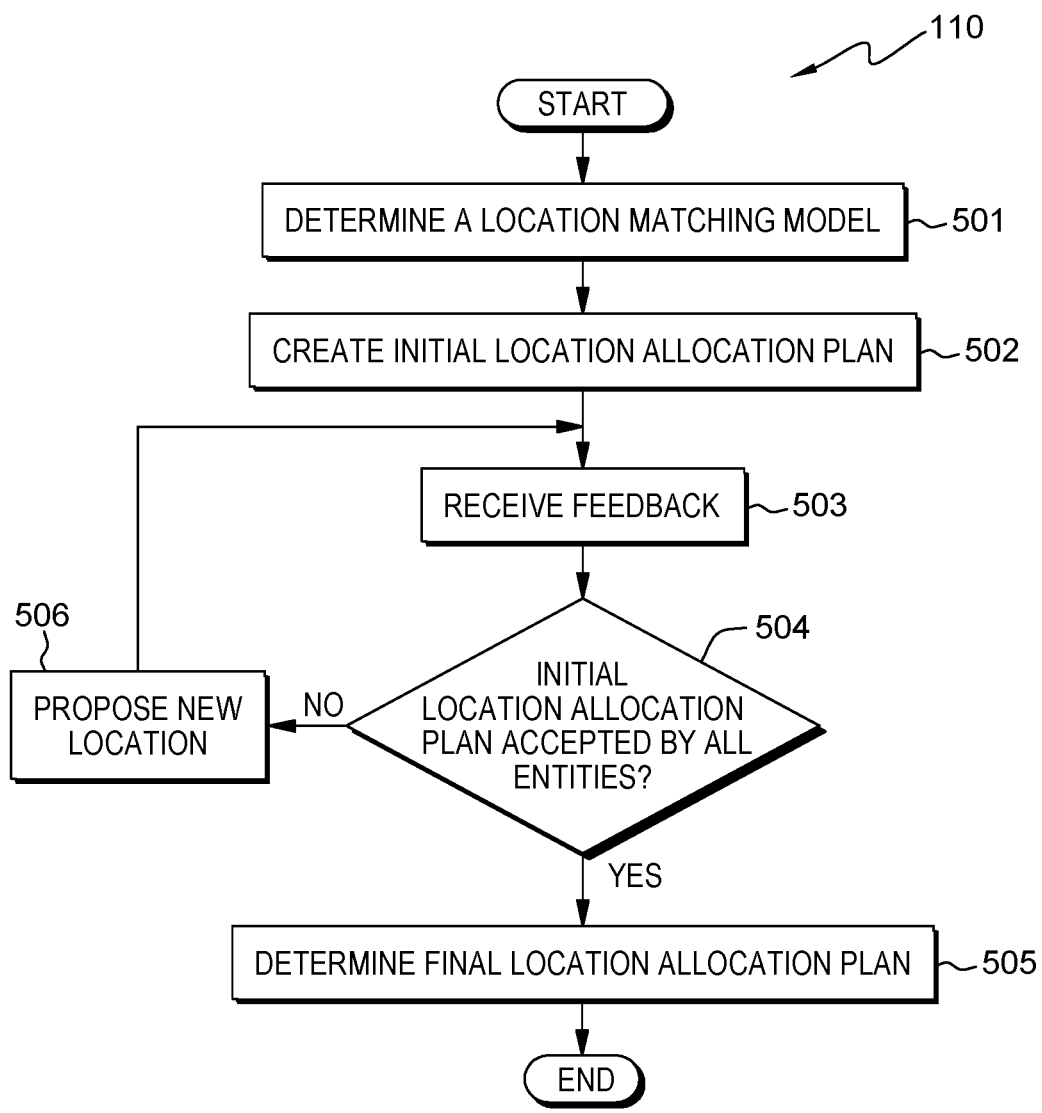
FIG. 5 illustrates a flowchart of a method for location allocation planning in accordance with an embodiment of the present disclosure.

FIG. 5 illustrates a flowchart of a method for location allocation planning in accordance with an embodiment of the present disclosure. At block 501, location allocation planner 110 determines at least one location matching model 112 for a current participating entity of an event. The entity may be, for example, a vendor of an exhibition, a trading party in a fair, etc. The current participating entity may include both a confirmed vendor and a potential vendor.

In accordance with embodiments of this disclosure, location matching model 112 may comprise resource matching model 114. The input of resource matching model 114 may comprise a resource feature of an historical event location associated with the current participating entity, and a resource feature of the current location. The output of resource matching model 114 may comprise a resource matching score indicating a matching degree between the current participating entity and the resource feature of the current location. In the above example, the resource matching score reflects the matching degree between the entity and resource feature of a location without considering the neighbors surrounding this location.

In accordance with embodiments of this disclosure, the resource feature comprises at least one from the following: a size of a location (for example, the size of the location can be simply classified into big booth and small booth, or any other classification, or simply represented by actual area of the booth, or represented by both shape and area of the booth, etc.), a place of a location (for example, whether the booth is near the entrance or not, whether the booth is near the exit or not, etc.), a function of a location (for example, whether the booth is in an interactive area where more facilities are required or in a display area where less facilities are required), event scope associated with a location (for example, all the booths can have the same event scope, like auto show, etc., or different booths in different areas can have different event scope, such as some areas are for food, and others for drink, etc.).

For example, if an entity used to choose a bigger booth in previous exhibitions, the resource matching score of the entity with a big booth in a current event may be set as "1," otherwise the resource matching score of the entity with a small booth may be set as "0." In another example, if an entity used to choose a booth near an entrance of an exhibition previously, the resource matching score of the entity with a booth in current exhibition far away from the entrance may be "0," while the resource matching score of the entity with a booth close to an entrance may be "1." In yet another example, if an entity used to choose a bigger booth for an electric vehicle exhibition, but a smaller booth for a fuel vehicle exhibition, and the current exhibition is for electric vehicles, the resource matching score of the entity with a big booth may be "1," and the resource matching score of the entity with a small booth may be "0."

Since resource matching model 114 is entity specific, resource matching model 114 may disregard one or more entity features in some embodiments. However, considering that data collected from an historical location application plan may be limited, there may not be enough data for each specific entity. For example, if data associated with entity X is not archived in a collected historical location allocation plan in database 118, then there is a need to compensate for the unavailability of an historical location allocation plan associated with entity X.

In accordance with embodiments of this disclosure, the input of resource matching model 114 further comprises: an entity feature of the current participating entity and an entity feature of a similar entity from an historical location allocation plan. The entity feature can comprise at least one of the following: an economic indicator of the entity (for example, revenue, profit, or any other economic indicator), and a business scope of the entity (for example, business area of an entity, types of products/services, etc.). For example, according to the historical location allocation plan, entity Y typically chooses a booth near an entrance, but there is no data about entity X in any historical location allocation plan. Since an entity feature of entity X is similar to that of entity Y (i.e., entity Y is similar to entity X), the resource matching score between entity X and a booth near the entrance in the current event is set as "1," while the resource matching score between entity X and a booth far from the entrance in the current event is set as "0."

It should be noted by those skilled in the art that an entity feature can be represented by text, value, or any other character. Optionally, the entity feature can be pre-processed before using. For example, revenue can be normalized based on exchange rates, and a business area can be represented by a classification number, etc.

In accordance with embodiments of this disclosure, the entity feature of the current participating entity comprises: an historical entity feature of the current participating entity, and a current entity feature of the current participating entity, wherein the historical entity feature is associated with the resource feature of the historical location. It may be understood by those skilled in the art that an historical entity feature may be collected by year, by quarter, or by any other time unit, such that there may be multiple historical entity features collected. Those historical entity features may be kept as is, or the historical entity features may be calculated based on an average value, i.e., multiple yearly revenues can be used as historical entity features, or an average yearly revenue can be used as one historical entity feature for the current participating entity.

It should be understood that a step of location allocation planner 110 generating at least one location matching model 112 can be included in the present embodiment or not. According to an embodiment, the process depicted in FIG. 5 can start from location allocation planner 110 generating location matching model 112 (not shown in FIG. 5), while in other embodiments, the process depicted in FIG. 5 can directly leverage location matching model 112 which location allocation planner 110 generated in advance (shown in block 501 of FIG. 5).

Figure 6A:
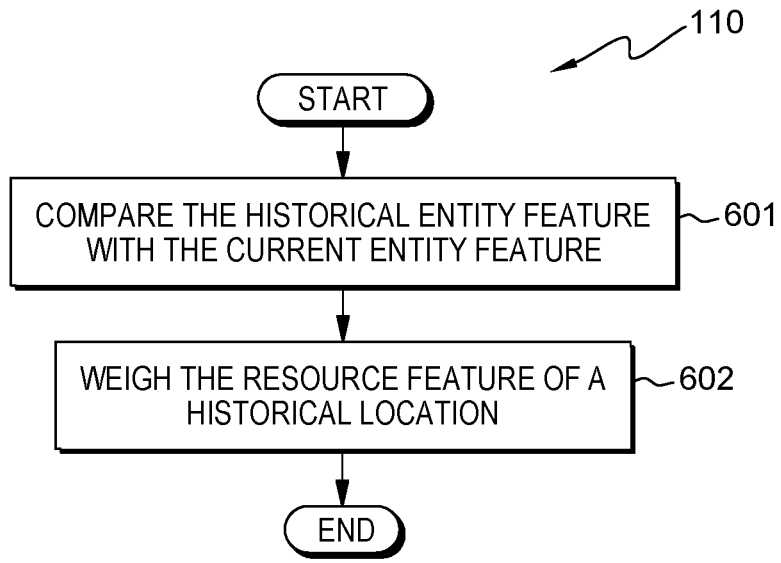
FIG. 6A illustrates a flowchart of a method for generating a resource matching model in accordance with an embodiment of the present disclosure.

In accordance with embodiments of this disclosure, FIG. 6A illustrates a flowchart of a method for generating resource matching model 114 in accordance with embodiments of the present disclosure, in which location allocation planner 110 compares the historical entity feature with the current entity feature (block 601), and location allocation planner 110 weighs the resource feature of an historical location based on the comparison result (block 602). The status of each entity may be dynamic over the time. For example, a company that was small in the past can become a big company, so that although previously the small company typically accepted a small booth, the company may change to a big booth representative of business growth and development. The entity feature indicating the economic status or business scope of the entity can be used to weigh resource features. The resource feature of an historical location associated with the current participating entity may apply only when the entity feature of the current participating entity does not change substantially. For example, entity X, which used to sell personal computers, typically chooses a booth in an activity area which enables more interactive activities with potential customers. With transformation of business focus of entity X to home appliances instead of personal computers, the resource feature of an historical location, i.e. "in an activity area" may not be applied anymore. The resource matching score between entity X and a booth in an activity area, therefore, can be set as "0."

It should be understood by those skilled in the art that the above examples of an entity feature, as well as resource features of multiple locations, are only provided for reference without limitation. Other types of entity features or resource features can also be applied in the present disclosure.

In accordance with embodiments of this disclosure, location matching model 112 may comprise neighborhood matching model 116. Different from resource matching model 114, neighborhood matching model 116 is used to indicate a matching degree between the entity and a potential neighbor of the entity. More specifically, the output of neighborhood matching model 116 may comprise a neighborhood matching score indicating a matching degree between the current participating entity and a neighbor entity which is to be located adjacently.

In an embodiment, the input of neighborhood matching model 116 may comprise an historical neighborhood feature associated with the current participating entity. For example, if entity Y is a neighbor of entity X in the historical location allocation plan, then the historical neighborhood feature associated with entity X is "entity Y," and the neighborhood matching score between entity X and entity Y is "1." If entity Z was never a neighbor of entity X in the historical location allocation plan, then the neighborhood matching score between entity X and entity Z is "0."

In another embodiment, the input of neighborhood matching model 116 may further comprise an entity feature of the current participating entity, and an entity feature of a similar entity from an historical location allocation plan. Thus, when there is not enough data about an historical neighborhood feature collected from an historical location allocation plan, neighborhood matching model 116 can continue to work to predict the matching degree between the current participating entity and the potential neighbor of the entity, even though the potential neighbor has not been placed adjacent with the entity before. The example in the above paragraph where entity Z was never a neighbor of entity X in the historical location allocation plan continues to be used. In case entity Z's entity feature is similar to that of entity Y, who was a neighbor of entity X in the historical location allocation plan, then the neighborhood matching score between the entity X and entity Z may be "1". There may be many different methods for determining whether entity Z's entity feature is similar to that of the entity Y, which will not be specifically described herein.

In accordance with embodiments of this disclosure, the entity feature can comprise: an historical entity feature of the current participating entity (wherein the historical entity feature is associated with the historical neighborhood feature), and a current entity feature of the current participating entity. The status of each entity may be dynamic over the time. For example, a company that was small in the past can become a big company. The entity feature indicating the economic status or business scope of the entity can be used to weigh the neighborhood feature as well. Thus, the neighborhood feature can influence weight only when the entity feature of the current participating entity does not change substantially.

Figure 6B:
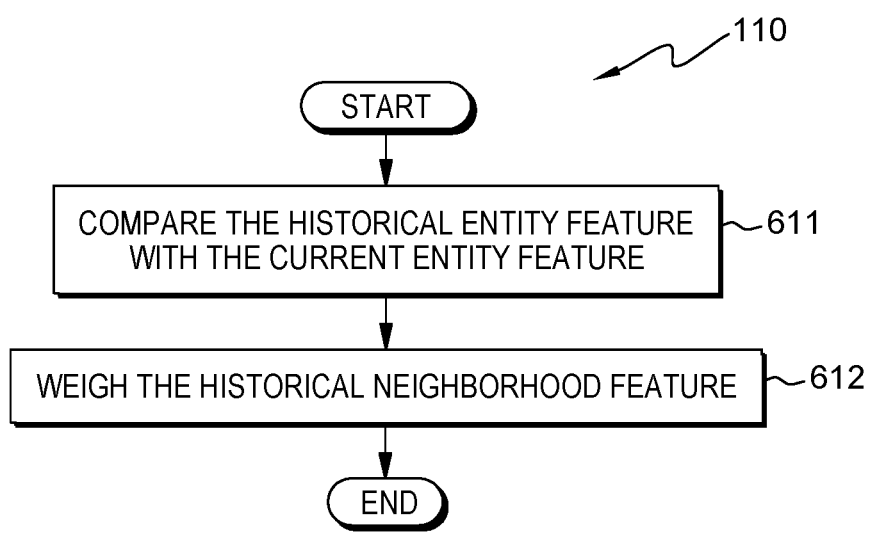
FIG. 6B illustrates a flowchart of a method for generating a neighborhood matching model in accordance with an embodiment of the present disclosure.

The aforementioned generation of location matching model 112 may comprise location allocation planner 110 generating neighborhood matching model 116. FIG. 6B illustrates a flowchart of a method for generating neighborhood matching model 116 in accordance with an embodiment of the present disclosure, in which location allocation planner 110 compares the historical entity feature with the current entity feature (block 611), and location allocation planner 110 weighs the historical neighborhood feature based on the comparison result (block 612). For example, entity X was a neighbor to entity Y when both entities sold personal computers. With the transformation of entity X, which now focuses on home appliances instead of personal computers, the historical neighborhood feature of entity X, which is referred to as "entity Y," cannot currently be used as a reference. The neighborhood matching score between entity X and entity Y may, therefore, be adjusted to "0."

It should be noted that although examples presented herein may use a "1" or a "0" to represent a resource matching score or a neighborhood matching score, those values are only provided for illustrative purposes without suggesting any limitation to this present disclosure. Any other way to measure or calculate the resource matching score or neighborhood matching score may be used in embodiments of the present disclosure.

Returning to FIG. 5, at block 502, location allocation planner 110 creates at least one initial location allocation plan for multiple current participating entities of the event based on location matching model 112. In accordance with embodiments of this disclosure, location matching model 112 can indicate a matching degree between the current participating entity and the current location, and location allocation planner 110 can create an initial location allocation plan based on output of location matching model 112 of each current participating entity to satisfy needs of overall current participating entities.

Figure 7:
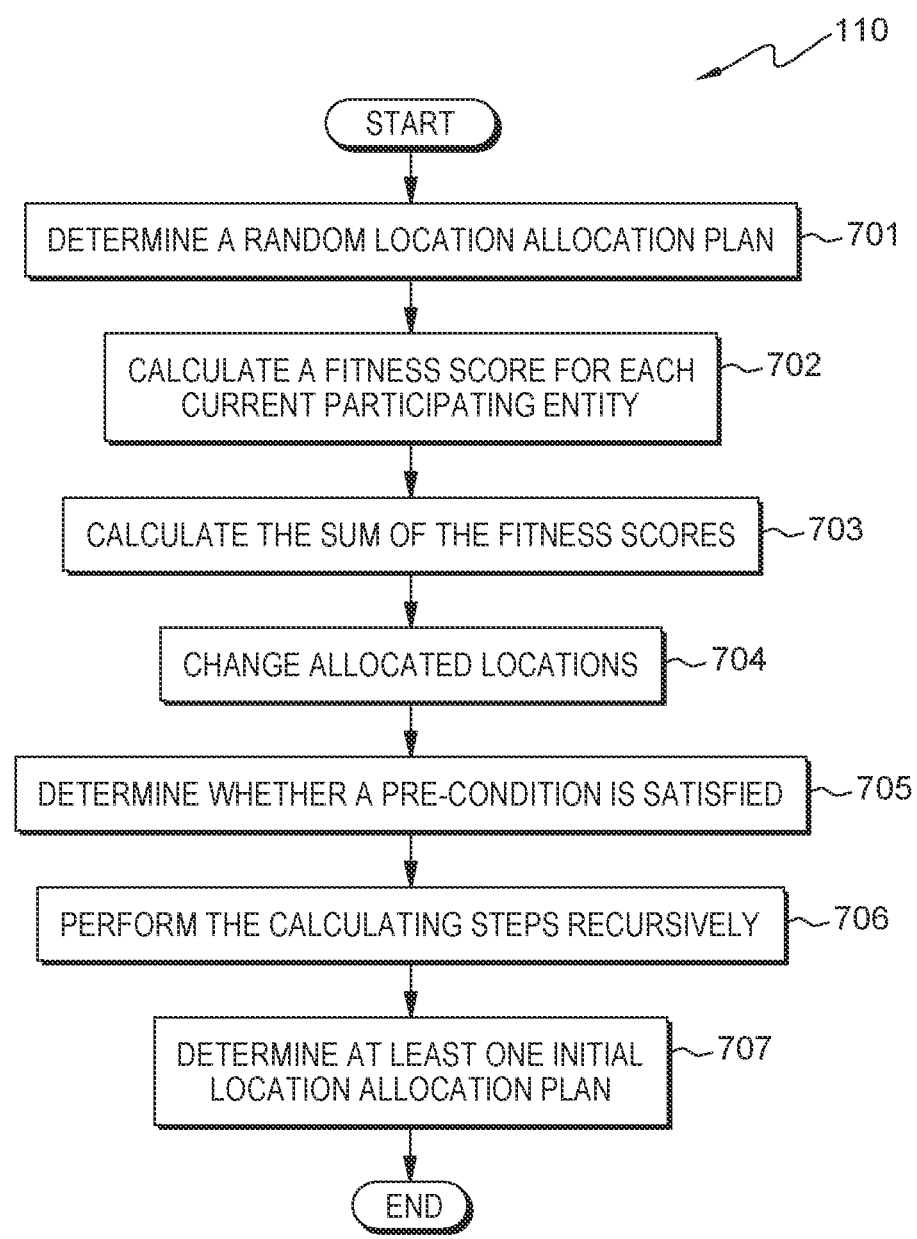
FIG. 7 illustrates a flowchart of a method for creating an initial location allocation plan in accordance with an embodiment of the present disclosure.

FIG. 7 illustrates a flowchart of a method for creating an initial location allocation plan in accordance with embodiments of the present disclosure. At block 701, location allocation planner 110 determines a random location allocation plan for the multiple current participating entities. Location allocation planner 110 creates the location allocation plan randomly so that the location allocation plan is not created in favor of any specific entity, but location allocation planner 110 can adjust the location allocation plan later to reach an optimal status for all the current participating entities overall. For example, the random location allocation plan can be illustratively shown as Table 1 below, wherein locations refer to booths shown in FIG. 4.

TABLE 1

| Entity | T | U | V | W | X | Y | Z |
|---|---|---|---|---|---|---|---|
| Location | A2 | A3 | A1 | C1 | B1 | C2 | C3 |
| Neighbors | A1/A3/B1 | A2 | A2 | C2 | A2/C2 | C1/B1/C3 | C2 |

At block 702, location allocation planner 110 calculates a fitness score for each of the multiple current participating entities. In accordance with embodiments of the present disclosure, the fitness score can comprise at least one of the following: the resource matching score and neighborhood matching score. The resource matching score can indicate a matching degree between the current participating entity and a resource feature of the current location, and the neighborhood matching score can indicate matching degree between the current participating entity and a neighbor entity which is to be located adjacently. For example, location allocation planner 110 can calculate the fitness score according to Formula 1 below:

$$\text{fit}_{ij}(n) = R_{ij}(n) + P_{ij}(n)$$

In Formula 1, "i" represents an entity, "n" represents a location allocation plan, "j" represents a location currently allocated to entity "i", "$R_{ij}(n)$" represents the resource matching score of entity "i" in the location allocation plan "n" which indicates matching degree between entity "i" and resource of current location "j", "$P_{ij}(n)$" represents the neighborhood matching score of entity "i" in the location allocation plan "n" which indicates matching degree between entity "i" and its current neighbor(s) surrounding location "j" and "$\text{fit}_{ij}(n)$" represents the fitness score of entity "i" in location "j". Location allocation planner 110 can calculate "$R_{ij}(n)$" and "$P_{ij}(n)$" based on the method described hereinabove. Examples of "$\text{fit}_{ij}(n)$" are shown as following in Table 2.

TABLE 2

| Entity | T | U | V | W | X | Y | Z |
|---|---|---|---|---|---|---|---|
| Location | A2 | A3 | A1 | C1 | B1 | C2 | C3 |
| Fitness Score | 3 | 2 | 1 | 0 | 1 | 0 | 0 |

At block 703, location allocation planner 110 calculates a sum of fitness scores for each of the multiple current participating entities. For example, the sum of fitness scores in Table 2 is 7.

At block 704, location allocation planner 110 changes allocated locations for at least two current participating entities to form a new location allocation plan. For example, location allocation planner 110 can exchange any two locations of two entities to form a new location allocation plan. As shown in Table 3 below, location allocation planner 110 exchanges locations A2 and A3, previously allocated to entity T and entity U. The sum of fitness scores in Table 3 below increased to 8. Although only two locations are exchanged in Table 3, it should be understood that any number of locations can be exchanged in other embodiments.

TABLE 3

| Entity | T | U | V | W | X | Y | Z |
|---|---|---|---|---|---|---|---|
| Location | A3 | A2 | A1 | C1 | B1 | C2 | C3 |
| Fitness Score | 2 | 2 | 1 | 0 | 3 | 0 | 0 |

At block 705, location allocation planner 110 determines whether a pre-condition is satisfied. In accordance with embodiments of this disclosure, the pre-condition can comprise at least one of the following: maximum times of changing allocated locations for at least two current participating entities, whether the sum of fitness scores will decrease responsive to the changing, and whether the sum of fitness scores exceeds a threshold. The change of allocated locations may result in the sum of fitness score increasing or decreasing, and finally end up with an optimal allocation plan with relatively high sum of fitness scores. The change of allocated locations, however, may be limited based on the pre-conditions hereinabove to make the recursive calculation more efficient and effective.

For example, if the maximum times of changing allocated locations is 100, there will be at most 100 candidates of location allocation plans, then location allocation planner 110 determines an optimal location allocation plan, i.e., an initial location allocation plan, within those 100 candidates. In another example, given the pre-condition comprises whether the sum of fitness scores will decrease if the changing is performed, location allocation planner 110 changes the location allocation plan along a direction to increase the sum of fitness scores, instead of decreasing the sum of fitness scores. In yet another example, given the pre-condition comprises whether the sum of fitness scores exceeds a threshold, location allocation planner 110 stops the changing once the location allocation plan is optimal enough (such as the sum of fitness score reaches 20).

At block 706, responsive to the pre-condition being not satisfied, location allocation planner 110 performs the calculating steps in block 702 and 703 recursively.

At block 707, responsive to the pre-condition being satisfied, location allocation planner 110 determines at least one initial location allocation plan which has a sum of fitness scores relatively higher than that of other candidates. Location allocation planner 110 may create several new location allocation plans at block 704. Among those new location allocation plans, some have relatively higher sum of fitness scores, representing more optimal allocation. Therefore, location allocation planner 110 can use those optimal location allocation plans for negotiation with the current participating entities. The number of determined initial location allocation plans can be determined in various ways, like selecting the top three new location allocation plans as initial location allocation plans, selecting the top 5% of new location allocation plans as initial location allocation plans, selecting all new location allocation plans whose sum of fitness scores exceed a threshold, e.g., 20, as initial location allocation plans, etc.

Figure 8:
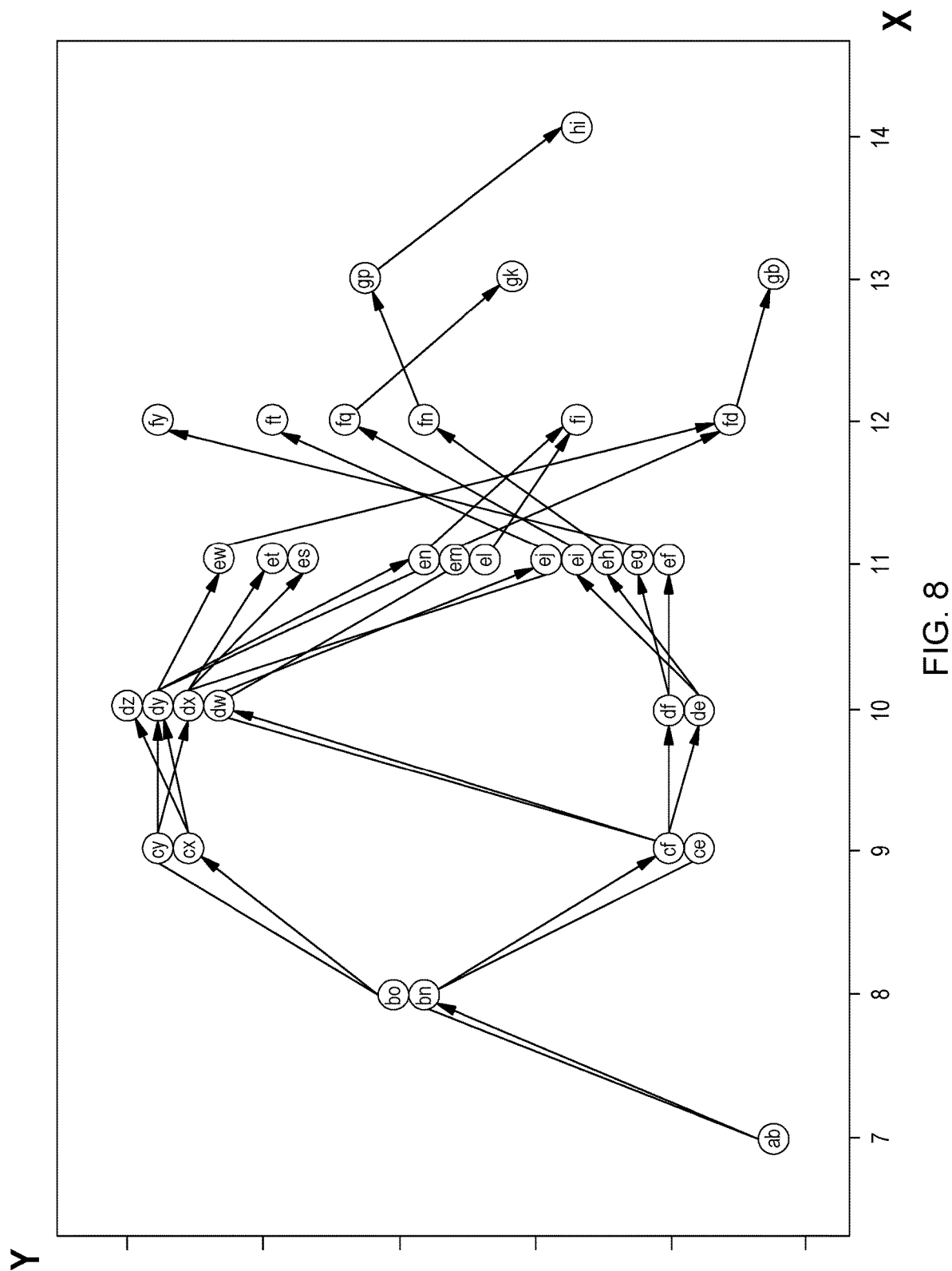
FIG. 8 illustrates an example tree structure for creating an initial location allocation plan in accordance with an embodiment of the present disclosure.
Figure 9:
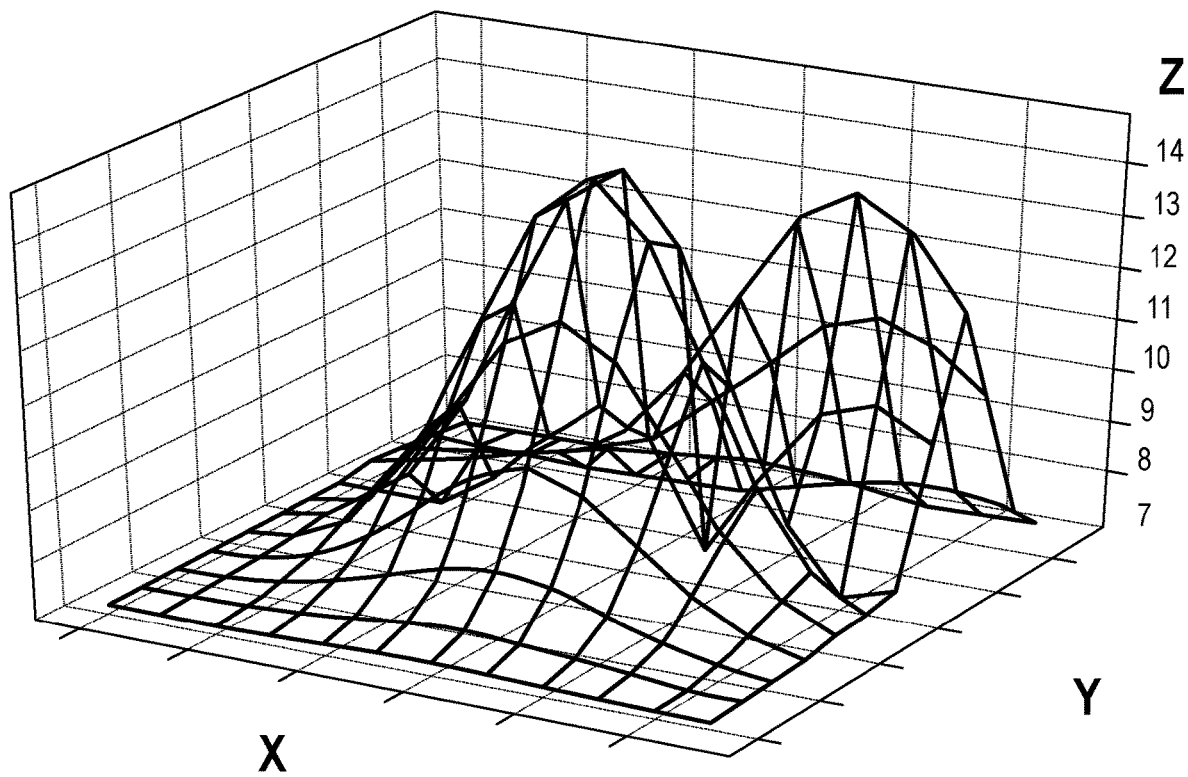
FIG. 9 illustrates an example 3D topology for creating an initial location allocation plan in accordance with an embodiment of the present disclosure.

FIG. 8 and FIG. 9 illustrate a process to create an initial location allocation plan. More specifically, FIG. 8 illustrates an example tree structure for creating an initial location allocation plan in accordance with an embodiment of the present disclosure. Each node, like "ab," "bo," "bn," represents a location allocation plan. As an example, "ab" is the random location allocation plan determined at block 701 of FIG. 7, wherein the second tier can contain up to 26 possibilities, namely "ba," "bb," ... to "bz," which represent new location allocation plans formed at block 704 of FIG. 7. Among the 26 possibilities, location allocation planner 110 keeps only nodes with increased sum of fitness scores and abandons the others. The cap of 26 referred above can be further adjusted based on actual possibilities of changing any two entities' location. In the example shown in Table 3, the cap can be 7×6±2=21 at maximum. The X axis shows the sum of fitness scores for each node. For example, the value of node "ab" in X axis is 7 representing its sum of fitness scores is 7. Nodes vertically aligned with each other have the same sum of fitness scores. Different nodes with the same sum of fitness scores are distributed in Y axis. For example, after location allocation planner 110 changes allocated locations for two entities in node "ab," nodes "bn" and "bo" are newly formed with higher sum of fitness scores. And after location allocation planner 110 changes allocated locations for two entities in node "bn," nodes "ce" and "cf" are newly formed with higher sum of fitness scores, and so on. However, as the sum of fitness score for nodes "ba," "bb," etc. do not increase due to the change of allocated locations, nodes "ba," "bb," etc. are abandoned, and that is why they are not shown in FIG. 8. After nodes "et," "es," "fy," "ef," "ft," "fi," "gk," "gb," and "hi" are formed, the increase of the sum of fitness scores ends. And among all the nodes in FIG. 8, location allocation planner 110 determines "hi," "gp," "gk," and "gb" with relatively higher sum of fitness scores as the initial location allocation plans at block 707 of FIG. 7.

FIG. 9 illustrates an example 3D topology for creating an initial location allocation plan in accordance with embodiments of the present disclosure. Each intersection at the 3D topology represents a location allocation plan (either the random location allocation plan or any one of the new location allocation plans) or a node in FIG. 8. The Z axis represents the sum of fitness scores for each node, therefore location allocation plans with the same height in Z axis means the same sum of fitness scores. X/Y can be any dimension of interests, depending on a pre-defined way to visualize the topology. Starting from an intersection of FIG. 9, there are multiple possibilities to move forward due to exchange of locations of any two entities (maximum can be 26 described hereinabove), but for visualization purposes, only four possibilities are shown to demonstrate paths toward peak or bottom. After multiple rounds of changing locations at block 704 of FIG. 7, the top(s) of the hills, also referred as local maximum, demonstrate those nodes or location allocation plans with a relatively high sum of fitness scores, which location allocation planner 110 determines at block 707 of FIG. 7 as the initial location allocation plan(s).

Even though 2D topology and 3D topology are shown in FIG. 8 and FIG. 9, respectively, they are not intended to suggest any limitation to the present disclosure, i.e., all steps in FIG. 7 can be executed without any visualization process, such as those shown in FIG. 8 and FIG. 9. In addition, the steps of FIG. 7 can be executed by other visualization processes or algorithms not shown in FIG. 8 or FIG. 9.

Now referencing back to FIG. 5, at block 503, location allocation planner 110 receives feedback from the multiple current participating entities. As location allocation planner 110 designed the initial location allocation plan to satisfy the needs of the overall group of the current participating entities, the plan may not be agreed to by some of the current participating entities. Therefore, further bargaining with the current participating entities can help to determine the final location allocation plan.

At block 504, responsive to receiving the feedback from the multiple current participating entities, location allocation planner 110 determines whether the initial location allocation is accepted by all current participating entities. In an embodiment, all positive responses, for example, "accept," from each of the entities are required. In another embodiment, location allocation planner 110 may determine that no response by a specific entity in the feedback period for a pre-defined duration of time can be considered as an "accept." In a further embodiment, if location allocation planner 110 receives a counter proposal for another location, location allocation planner 110 can consider that response as an "accept" because the counter proposed location is acceptable by the entity.

At block 505, responsive to the feedback from the multiple current participating entities indicating the initial location allocation plan is accepted by all current participating entities, location allocation planner 110 determines a final location allocation plan, based on the initial location allocation plan. In an embodiment, location allocation planner 110 stores the final location allocation plan in database 118 for use with future location allocation planning. In an embodiment, location allocation planner 110 learns and stores bargaining zones for participating entities based on the responses of the entities to the proposed location allocation plan. A bargaining zone or range may be different resource features or combinations of resource features that may acceptable to an entity. For example, location allocation planner 110 may determine that an entity that has required a large booth in the past agreed to taking a small booth that was near an entrance. Location allocation planner 110 learns the "bargaining zone" of the entity and stores the preference in database 118. Referring back to FIG. 7, in an embodiment, location allocation planner 110 may determine that a move that decreases the sum of fitness but is within a bargaining zone of an entity is preferred over a move that only decreases the sum of fitness.

At block 506, responsive to the feedback from the multiple current participating entities indicating the initial location allocation plan is not accepted by all current participating entities, location allocation planner 110 proposes at least one new location. In an embodiment, location allocation planner 110 may receive a counter proposed location from an unaccepting entity. Responsive to proposing a new location, location allocation planner 110 returns to block 503 to receive additional feedback for determining a new location allocation plan.

Table 4 below shows an initial round of feedback from the current participating entities, wherein entity T "accepts" location A1, entity V "accepts" location A3, entity Z "accepts" location C3, entity X does not accept location C1 and counter proposes another location it prefers, i.e., A2, entity Y does not accept the location C2 and counter proposes another location it prefers, i.e., B1, while entities U and W do not respond to their allocated locations. It should be noted that Table 4 below only illustrates examples of feedback that may be received from the entities and does not suggest any limitation regarding to forms of feedback. In some examples, an entity may "reject" an allocated location (not shown in Table 4), therefore another location will be further proposed to the entity, which will be further described in detail hereinafter.

TABLE 4

| Entity | T | U | V | W | X | Y | Z |
|---|---|---|---|---|---|---|---|
| Location | A1 | A2 | A3 | B1 | C1 | C2 | C3 |
| Near Entrance (Yes/No) | N | N | Y | Y | N | N | Y |
| Neighbor | A2 | A1/A3/B1 | A2 | A2/C2 | C2 | C1/B1/C3 | C2 |
| Feedback | Accept | | Accept | | Counter: A2 | Counter: B1 | Accept |

In accordance with embodiments of this disclosure, there are multiple initial location allocation plans (such as "hi," "gp," "gk," and "gb" as shown in FIG. 8). Responsive to the feedback from the multiple current participating entities indicating the initial location allocation plan (for example "hi" in FIG. 8) is not accepted by at least one current participating entity and no counter proposed location is received from the unaccepting entity (or the allocated location is "rejected" by at least one current participating entity), location allocation planner 110 proposes a new location to the unaccepting entity based on another candidate of the multiple initial location allocation plans (for example "gp" in FIG. 8). In Table 5 below, Location allocation planner 110 marks those entity/location pairs (e.g., T/A1, V/A3, Z/C3, X/A2, Y/B1) that were accepted as a status of "locked." Location allocation planner 110 proposes a new location for those entities (i.e., entity U and entity W) who are not "locked" yet until the initial location allocation plan is accepted by all current participating entities.

TABLE 5

| Vendor | T | U | V | W | X | Y | Z |
|---|---|---|---|---|---|---|---|
| Location | A1 | C2 | A3 | C1 | A2 | B1 | C3 |
| Near Entrance (Yes/No) | N | N | Y | N | N | Y | Y |
| Neighbor | A2 | C1/B1/C3 | A2 | | C2 | A1/A3/B1 | A2/C2 | C2 |
| Status | locked | | locked | | locked | locked | locked |

It should be noted that, embodiments of the present disclosure do not exclude any additional communication or negotiation with any of the current participating entities which may be helpful in resolving the final location allocation plan.

In accordance with embodiments of this disclosure, location allocation planner 110 may reserve some locations before determining an initial location allocation plan, such that those location/entity pairs can be "locked" (for example, entity/location pair X/C1 in Table 6 below).

TABLE 6

| Vendor | T | U | V | W | X | Y | Z |
|---|---|---|---|---|---|---|---|
| Location | A1 | A2 | A3 | B1 | C1 | C2 | C3 |
| Near Entrance (Yes/No) | N | N | Y | Y | N | N | Y |
| Neighbor | A2 | A1/A3/B1 | A2 | A2/C2 | C2 | C1/B1/C3 | C2 |
| Status | | | | | locked | | |
| Feedback | | | | | NA | | |

With embodiments of this disclosure, location allocation planner 110 can determine a location allocation plan without a location allocation rule being set in advance. Location allocation planner 110 can calculate a matching degree between an entity with a resource feature of a location or matching degree between an entity with a potential neighbor as a basis to measure the fitness of a location to the entity and finally measure the fitness of whole location allocation plan.

It should be also noted that the method or system of location allocation planning according to embodiments of this disclosure can be implemented by computer system/server 12 of FIG. 1, any computing node in FIG. 2 or any component in FIG. 3.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for location allocation planning, the method comprising:
   training, by one or more computing units, at least one location matching model with a training set of a plurality of past location allocation plans and one or more bargaining zones associated with a plurality of past event participants, wherein the one or more bargaining zones are one or more resource features preferred by at least one of the plurality of past event participants, and wherein each of the one or more resource features describe an attribute of an event location;
   generating, by one or more computing units, the at least one location matching model for a first current event participant of a plurality of current event participants of a current event, wherein an output of the location matching model indicates a matching degree between the first current event participant and a current event location, wherein generating the at least one location matching model comprises:
      generating, by one or more computing units, at least one resource matching model, which further comprises:
         comparing, by one or more computing units, an historical feature of the first current event participant with a current feature of the first current event participant; and
         weighing, by one or more computing units, a resource feature of an historical event location based on a result of the comparison,
      wherein an input of the at least one resource matching model comprises at least one of: the resource feature of an historical event location associated with the first current event participant, a resource feature of the current event location, a feature of the first current event participant, and a feature of an event participant similar to the first current event participant from an historical location allocation plan, wherein the resource feature of the current event location is a function of the current event location, and wherein an output of the at least one resource matching model comprises a resource matching score indicating a matching degree between the first current event participant and the resource feature of the current event location;
   creating, by one or more computing units, at least one initial location allocation plan for the plurality of current event participants of the event based, at least in part, on the output of the at least one location matching model;
   receiving, by one or more computing units, feedback associated with the initial location allocation plan from at least one of the plurality of current event participants;
   responsive to the received feedback indicating acceptance of the initial location allocation plan, determining, by one or more computing units, a final location allocation plan based on the initial location allocation plan; and
   based on the received feedback, determining, by one or more computing units, at least one bargaining zone associated with at least one of the plurality of current event participants.

2. The method of claim 1, wherein the feature of the first current event participant is selected from the group consisting of: an economic status of the first current event participant and a business scope of the first current event participant, and the resource feature of the current event location is selected from the group consisting of: a size of a location, a place of a location, and an event scope associated with a location.

3. The method of claim 1, wherein the feature of the first current event participant is selected from the group consisting of: an historical feature of the first current event participant and a current feature of the first current event participant, wherein the historical feature of the first current event participant is associated with the resource feature of the historical event location.

4. The method of claim 1, wherein generating the at least one location matching model comprises generating, by one or more computing units, at least one neighborhood matching model, which further comprises:
   comparing, by one or more computing units, an historical feature of the first current event participant with a current feature of the first current event participant, and
   weighing, by one or more computing units, a historical neighborhood feature based on a result of the comparison.

5. The method of claim 4, wherein the at least one location matching model comprises at least one neighborhood matching model, and wherein an input of the neighborhood matching model comprises: an historical neighborhood feature associated with the first current event participant, and wherein an output of the neighborhood matching model comprises a neighborhood matching score indicating matching degree between the first current event participant and a neighbor event participant located adjacent to the first current event participant in the current event location.

6. The method of claim 5, wherein the input of the neighborhood matching model further comprises: a feature of the first current event participant, and a feature of a similar event participant from an historical location allocation plan.

7. The method of claim 4, wherein the feature is selected from the group consisting of: an historical feature of the first current event participant, and a current feature of the current event participant, wherein the historical feature is associated with the historical neighborhood feature.

8. The method of claim 1, wherein creating the at least one initial location allocation plan comprises:
   determining, by one or more computing units, a random location allocation plan for the plurality of current participating entities;
   for each of the plurality of current event participants, calculating, by one or more computing units, a fitness score which includes at least one of the following: a resource matching score and a neighborhood matching score;
   calculating, by one or more computing units, a sum of fitness scores for each of the plurality of current event participants;
   changing, by one or more computing units, an allocated location for at least two of the plurality of current event participants to form a new location allocation plan;
   determining, by one or more computing units, whether a pre-condition of the new location allocation plan is satisfied;
   responsive to determining the pre-condition is not satisfied, performing, by one or more computing units, the calculating step recursively until the pre-condition is satisfied, thereby determining at least two additional location allocation plans; and responsive to the pre-condition being satisfied, determining, by one or more computing units, at least one initial location allocation plan associated with the sum of fitness scores higher than the sum of fitness scores associated with the at least two additional location allocation plans.

9. The method of claim 8, wherein the pre-condition is selected from the group consisting of: a maximum number of times of performing the changing, whether the sum of fitness scores will decrease responsive to the changing, and whether the sum of fitness scores exceeds a threshold.

10. The method of claim 1, further comprising, responsive to the feedback indicating the initial location allocation plan is not accepted by at least one of the plurality of current event participants, receiving, by one or more computing units, a counter proposed location from at least one of the plurality of current event participants to form a final location allocation plan.

11. The method of claim 1, wherein there is a plurality of initial location allocation plans, and the method further comprises: responsive to the feedback from the plurality of current event participants indicating the initial location allocation plan is not accepted by at least one of the plurality of current event participants, and no counter proposed location is received from at least one of the plurality of current event participants, proposing, by one or more computing units, a new location to the at least one of the plurality of current event participants based on another candidate of the plurality of initial location allocation plans.

12. A computer program product for location allocation planning, the computer program product comprising:

one or more computer readable storage devices and program instructions stored on the one or more computer readable storage devices, the stored program instructions comprising:

program instructions to train at least one location matching model with a training set of a plurality of past location allocation plans and one or more bargaining zones associated with a plurality of past event participants, wherein the one or more bargaining zones are one or more resource features preferred by at least one of the plurality of past event participants, and wherein each of the one or more resource features describe an attribute of an event location;

program instructions to generate the at least one location matching model for a first current event participant of a plurality of current event participants of a current event, wherein an output of the location matching model indicates a matching degree between the first current event participant and a current event location, wherein generating the at least one location matching model comprises:

program instructions to generate at least one resource matching model, which further comprises:

program instructions to compare an historical feature of the first current event participant with a current feature of the first current event participant; and program instructions to weigh a resource feature of an historical event location based on a result of the comparison, wherein an input of the at least one resource matching model comprises at least one of: the resource feature of an historical event location associated with the first current event participant, a resource feature of the current event location, a feature of the first current event participant, and a feature of an event participant similar to the first current event participant from an historical location allocation plan, wherein the resource feature of the current event location is a function of the current event location, and wherein an output of the at least one resource matching model comprises a resource matching score indicating a matching degree between the first current event participant and the resource feature of the current event location;

program instructions to create at least one initial location allocation plan for the plurality of current event participants of the event based, at least in part, on the output of the at least one location matching model;

program instructions to receive feedback associated with the initial location allocation plan from at least one of the plurality of current event participants;

responsive to the received feedback indicating acceptance of the initial location allocation plan, program instructions to determine a final location allocation plan based on the initial location allocation plan; and based on the received feedback, determining, by one or more computing units, at least one bargaining zone associated with at least one of the plurality of current event participants.

13. The computer program product of claim 12, wherein the program instructions to create the at least one initial location allocation plan comprise:

program instructions to determine a random location allocation plan for the plurality of current event participants;

for each of the plurality of current event participants, program instructions to calculate a fitness score which includes at least one of the following: a resource matching score and a neighborhood matching score;

program instructions to calculate a sum of fitness scores for each of the plurality of current event participants;

program instructions to change an allocated location for at least two of the plurality of current event participants to form a new location allocation plan;

program instructions to determine whether a pre-condition of the new location allocation plan is satisfied;

responsive to determining the pre-condition is not satisfied, program instructions to perform the calculating step recursively until the pre-condition is satisfied, thereby determining at least two additional location allocation plans; and responsive to the pre-condition being satisfied, program instructions to determine at least one initial location allocation plan associated with the sum of fitness scores higher than the sum of fitness scores associated with the at least two additional location allocation plans.

14. A computer system for location allocation planning, the computer system comprising:

one or more computer processors;

one or more computer readable storage devices;

program instructions stored on the one or more computer readable storage devices for execution by at least one of the one or more computer processors, the stored program instructions comprising:

program instructions to train at least one location matching model with a training set of a plurality of past location allocation plans and one or more bargaining zones associated with a plurality of past event participants, wherein the one or more bargaining zones are one or more resource features preferred by at least one of the plurality of past event participants, and wherein each of the one or more resource features describe an attribute of an event location;

program instructions to generate the at least one location matching model for a first current event participant of a plurality of current event participants of a current event, wherein an output of the location matching model indicates a matching degree between the first current event participant and a current event location, wherein generating the at least one location matching model comprises:

program instructions to generate at least one resource matching model, which further comprises:

program instructions to compare an historical feature of the first current event participant with a current feature of the first current event participant; and program instructions to weigh a resource feature of an historical event location based on a result of the comparison, wherein an input of the at least one resource matching model comprises at least one of: the resource feature of an historical event location associated with the first current event participant, a resource feature of the current event location, a feature of the first current event participant, and a feature of an event participant similar to the first current event participant from an historical location allocation plan, wherein the resource feature of the current event location is a function of the current event location, and wherein an output of the at least one resource matching model comprises a resource matching score indicating a matching degree between the first current event participant and the resource feature of the current event location;

program instructions to create at least one initial location allocation plan for the plurality of current event participants of the event based, at least in part, on the output of the at least one location matching model;

program instructions to receive feedback associated with the initial location allocation plan from at least one of the plurality of current event participants;

responsive to the received feedback indicating acceptance of the initial location allocation plan, program instructions to determine a final location allocation plan based on the initial location allocation plan; and based on the received feedback, determining, by one or more computing units, at least one bargaining zone associated with at least one of the plurality of current event participants.

15. The computer system of claim 14, wherein the program instructions to create the at least one initial location allocation plan comprise:

program instructions to determine a random location allocation plan for the plurality of current event participants;

for each of the plurality of current event participants, program instructions to calculate a fitness score which includes at least one of the following: a resource matching score and a neighborhood matching score;

program instructions to calculate a sum of fitness scores for each of the plurality of current participating entities;

program instructions to change an allocated location for at least two of the plurality of current participating entities to form a new location allocation plan;

program instructions to determine whether a pre-condition of the new location allocation plan is satisfied;

responsive to determining the pre-condition is not satisfied, program instructions to perform the calculating step recursively until the pre-condition is satisfied, thereby determining at least two additional location allocation plans; and responsive to the pre-condition being satisfied, program instructions to determine at least one initial location allocation plan associated with the sum of fitness scores higher than the sum of fitness scores associated with the at least two additional location allocation plans.

\* \* \* \* \*